(12) United States Patent
Bantoft et al.

(10) Patent No.: US 9,565,618 B1
(45) Date of Patent: Feb. 7, 2017

(54) AIR TO GROUND MANAGEMENT OF MULTIPLE COMMUNICATION PATHS

(71) Applicant: Satcom Direct, Inc., Satellite Beach, FL (US)

(72) Inventors: Ken Bantoft, Melbourne, FL (US); Curt Gray, Glendale, AZ (US)

(73) Assignee: Satcom Direct, Inc., Melbourne, FL (US)

( * ) Notice: Subject to any disclaimer, the term of this patent is extended or adjusted under 35 U.S.C. 154(b) by 0 days.

(21) Appl. No.: 14/317,173

(22) Filed: Jun. 27, 2014

Related U.S. Application Data

(60) Provisional application No. 61/888,593, filed on Oct. 9, 2013.

(51) Int. Cl.
*H04W 40/20* (2009.01)
*H04B 7/185* (2006.01)
*H04W 8/26* (2009.01)

(52) U.S. Cl.
CPC ......... *H04W 40/20* (2013.01); *H04B 7/18584* (2013.01); *H04W 8/26* (2013.01)

(58) Field of Classification Search
None
See application file for complete search history.

(56) References Cited

U.S. PATENT DOCUMENTS

| | | | |
|---|---|---|---|
| 5,493,309 A | 2/1996 | Bjornholt | |
| 5,937,349 A | 8/1999 | Andresen | |
| 5,959,560 A | 9/1999 | Said | |
| 6,014,606 A | 1/2000 | Tu | |
| 6,151,497 A | 11/2000 | Yee | |
| 6,201,797 B1 | 3/2001 | Leuca | |
| 6,400,945 B1 | 6/2002 | Jensen et al. | |
| 6,741,841 B1 | 5/2004 | Mitchell | |
| 6,781,968 B1 | 8/2004 | Colella | |
| 6,892,069 B1* | 5/2005 | Flynn | H04W 8/26 370/405 |
| 6,954,794 B2* | 10/2005 | Rudd | H04L 29/12349 370/351 |
| 6,970,704 B2 | 11/2005 | Jensen et al. | |

(Continued)

FOREIGN PATENT DOCUMENTS

WO     2007134498     11/2007

OTHER PUBLICATIONS

Marpe, et al, A Two-Layered Wavelet-Based Algorithm for Efficient Lossless and Lossy Image Compression, IEEE Transactions on Circuits and Systems for Video Technology, 2000, pp. 1094-1102, vol. 10, No. 7.

(Continued)

*Primary Examiner* — Hong Cho
(74) *Attorney, Agent, or Firm* — Brian S. Steinberger; Law Offices of Brian S. Steinberger, P.A.

(57) ABSTRACT

Methods, systems and devices for an avionics mobile computer device capable of carrying out communications while moving among a plurality of inter-connected networks, and a mobile computer management device for managing moving location information of the mobile computer and transferring packets destined to the avionics mobile computer to a current location of the avionics mobile computer, as well as a mobile computer management method and a communication control method suitable for these devices.

13 Claims, 2 Drawing Sheets

(56) References Cited

U.S. PATENT DOCUMENTS

| | | |
|---|---|---|
| 6,978,128 B1 | 12/2005 | Raman |
| 7,023,365 B1 | 4/2006 | Mitchell et al. |
| 7,027,898 B1 | 4/2006 | Leger et al. |
| 7,209,978 B2 * | 4/2007 | Thubert .................. H04L 12/24 707/999.001 |
| 7,436,762 B2 * | 10/2008 | Oka ........................ H04W 4/16 370/218 |
| 7,660,579 B2 | 2/2010 | Jensen |
| 7,761,793 B1 | 7/2010 | Mitchell |
| 7,852,819 B2 | 12/2010 | Gil |
| 8,305,936 B2 | 11/2012 | Wang |
| 8,339,991 B2 | 12/2012 | Biswas |
| 8,432,808 B1 | 4/2013 | Dankberg et al. |
| 8,477,771 B2 | 7/2013 | Biswas |
| 8,527,662 B2 | 9/2013 | Biswas |
| 9,008,868 B1 | 4/2015 | Bantoft et al. |
| 9,318,024 B1 | 4/2016 | Natwick et al. |
| 2003/0055975 A1 | 3/2003 | Nelson et al. |
| 2003/0123481 A1 | 7/2003 | Neale et al. |
| 2004/0064588 A1 | 4/2004 | Jungck |
| 2005/0041859 A1 | 2/2005 | Nguyen |
| 2005/0053026 A1 * | 3/2005 | Mullan .............. H04B 7/18508 370/316 |
| 2005/0083358 A1 | 4/2005 | Lapstun |
| 2005/0177647 A1 * | 8/2005 | Anantha ........... H04L 29/12396 709/249 |
| 2005/0215238 A1 | 9/2005 | Macaluso |
| 2005/0215249 A1 | 9/2005 | Little |
| 2005/0220055 A1 * | 10/2005 | Nelson ................ H04B 7/18506 370/331 |
| 2005/0244060 A1 | 11/2005 | Nagarajan |
| 2006/0013264 A1 | 1/2006 | Eichler et al. |
| 2006/0092897 A1 * | 5/2006 | Pirila .................... H04W 48/02 370/338 |
| 2006/0115164 A1 | 6/2006 | Cooley |
| 2006/0156357 A1 | 7/2006 | Lockridge et al. |
| 2006/0293049 A1 | 12/2006 | Jensen |
| 2007/0123290 A1 * | 5/2007 | Stenmark ............ H04W 52/288 455/522 |
| 2008/0182573 A1 * | 7/2008 | Lauer ................. H04B 7/18506 455/431 |
| 2009/0023403 A1 | 1/2009 | Laberge |
| 2009/0109849 A1 | 4/2009 | Wood et al. |
| 2009/0304096 A1 | 12/2009 | Khattab et al. |
| 2010/0027461 A1 * | 2/2010 | Bothorel ............ H04B 7/18506 370/316 |
| 2010/0035607 A1 | 2/2010 | Horr et al. |
| 2010/0279698 A1 | 11/2010 | Wong |
| 2011/0046842 A1 | 2/2011 | Smith |
| 2011/0063980 A1 * | 3/2011 | Kondo .................. H04L 45/122 370/238 |
| 2011/0114726 A1 | 5/2011 | Porter et al. |
| 2011/0149849 A1 | 6/2011 | Brownrig |
| 2011/0255506 A1 * | 10/2011 | Toth .................... H04B 7/18506 370/331 |
| 2012/0033851 A1 | 2/2012 | Chen et al. |
| 2012/0083971 A1 | 4/2012 | Preston |
| 2012/0109447 A1 | 5/2012 | Yousefi et al. |
| 2012/0232791 A1 | 9/2012 | Sterkel et al. |
| 2012/0303826 A1 * | 11/2012 | Nelson ............... H04B 7/18506 709/228 |
| 2013/0103786 A1 | 4/2013 | Miglore |
| 2013/0120166 A1 | 5/2013 | Kommuri et al. |
| 2013/0158821 A1 | 6/2013 | Ricci |
| 2013/0235728 A1 * | 9/2013 | Le ........................ H04W 28/12 370/236 |
| 2013/0297103 A1 | 11/2013 | Baker et al. |
| 2014/0045520 A1 | 2/2014 | Lim et al. |
| 2014/0137162 A1 | 5/2014 | McNamee et al. |

OTHER PUBLICATIONS

Linux man page, gzip, gunzip, zcat—compress or expand files, 2002, 7 pages.
Rockwell Collins, EBACE 2012 Press Kit, retrieved on Oct. 4, 2013, retrieved from http://www.rockwellcollins.com/sitecore/content/Data/News/2012_2012_Yr/CS/FY12CSN . . . , 2 pages.
Vandel, et al., Head-Up Guidance System Technology—A Clear Path to Increasing Flight Safety, Flight Safety Foundation, 2009, 29 pages.
Rockwell Collins, Ascent Mobile Applications, 2012, 2 pages.
Rockwell Collins, Falcon Cabin HD, Elevate your flight experience, 2012, 12 pages.
Rockwell Collins, Pro Line Fusion Advanced Avionics, 2011, 8 pages.
Rockwell Collins, Venue High-Definition Cabin Management System, 2012, 12 pages.
Rockwell Collins, Rockwell Collins to provide advanced cabin management and HD entertainment system for Falcon 7X and Falcon 900LX, News Release, 2012, 1 page.
Rockwell Collins, Jet Aviation St. Louis to install Rockwell Collins' Venue HD cabin system on a Global Express, News Release, 2012, 2 pages.
Rockwell Collins, Airshow 4000, retrieved on Oct. 4, 2013, retrieved from http://www.rockwellcollins.com/sirecore/content/Data/Products/Cabin/Moving_Map_syst . . . , 2 pages.
Rockwell Collins, Airshow App for Mobile Devices, 2012, 4 pages.
Rockwell Collins, Airshow 4000 Version 2, 2013, 9 pages.

\* cited by examiner

AIR TO GROUND MANAGEMENT OF MULTIPLE COMMUNICATION PATHS

CROSS REFERENCE TO RELATED APPLICATIONS

This invention claims the benefit of priority to U.S. Provisional Application Ser. No. 61/888,593 filed Oct. 9, 2013. The entire disclosure of the application listed in this paragraph is incorporated herein by specific reference thereto.

FIELD OF THE INVENTION

This invention relates to avionic systems and, in particular, to methods, systems and devices for management of air-to-ground and ground-to-air communications by actively monitoring different communication connection types and switching communication traffic to the highest priority function connection.

BACKGROUND AND PRIOR ART

Known prior art communication management systems for avionics includes International Patent Application WO 2007134498 A1 which describes a system and method for implementing the mobile interne protocol IP access. U.S. Pat. No. 6,978,128 issued to Raman Dec. 20, 2005 describes a system and method to allow simple IP mobile nodes to operate seamlessly in a mobile IP network (home and foreign) with true roaming capabilities.

SUMMARY OF THE INVENTION

A primary objective of the present invention is to provide methods, systems and devices for a communication management system for avionics that can manage multiple different connection types for Air to Ground and Ground to Air communications by actively monitoring the different communication connections types and switching traffic to the highest priority functioning connection.

A secondary objective of the present invention is to provide methods, systems and devices for an avionic communication management system that maintains the connections of Internet TCP/IP traffic that is passing through the system, allowing passenger or system traffic to remain connected.

A third objective of the present invention is to provide methods, systems and devices for an avionics mobile computer device capable of carrying out communications while moving among a plurality of inter-connected networks, and a mobile computer management device for managing moving location information of the mobile computer and transferring packets destined to the avionics mobile computer to a current location of the avionics mobile computer, as well as a mobile computer management method and a communication control method suitable for these devices.

A first embodiment provides an avionics communication management system that includes an avionic mobile computer device capable of carrying out communications while moving among a plurality of inter-connected networks, and a mobile computer management device for managing moving location information of the mobile computer and transferring packets destined to the avionics mobile computer to a current location of the avionics mobile computer. The avionic mobile computer device uses a prioritization assignment to assign a priority level to the communication, the priority based on one or more of cost, capacity, speed, latency, performance or other characteristics, and is configurable by the owner of the avionics mobile computer device.

A second embodiment provides a mobile computer management and control method for avionic mobile communication devices that includes assigning an IP address to a mobile node of a communication network for communication between a ground network and an avionic network, monitoring two one or more different communication types; selecting one of the two or more different communication types based on a priority; and switching onboard passenger and avionic device traffic to the selected one of the two or more different communication types. Assigning an IP address includes using assigning a different Care Of Address for to each different connection associated with the mobile node such that the mobile device management computer communicates with the Mobile Node by sending traffic inside of packets destined for the Care Of Address.

The selecting step can include selecting one of the two or more different communication types based on one or more of a cost, capacity, speed, latency, performance or other characteristics, the priority configurable by an owner of the avionics mobile computer. The switching step includes switching between a plurality of different interconnected networks corresponding to a moving location of an aircraft. The method can include managing moving location information of a mobile avionic computer at a mobile computer management device and transferring traffic to the mobile avionic computer based on a current location of the moving aircraft.

Further objects and advantages of this invention will be apparent from the following detailed description of preferred embodiments which are illustrated schematically in the accompanying drawings.

DESCRIPTION OF THE PREFERRED EMBODIMENTS

Figure 1:
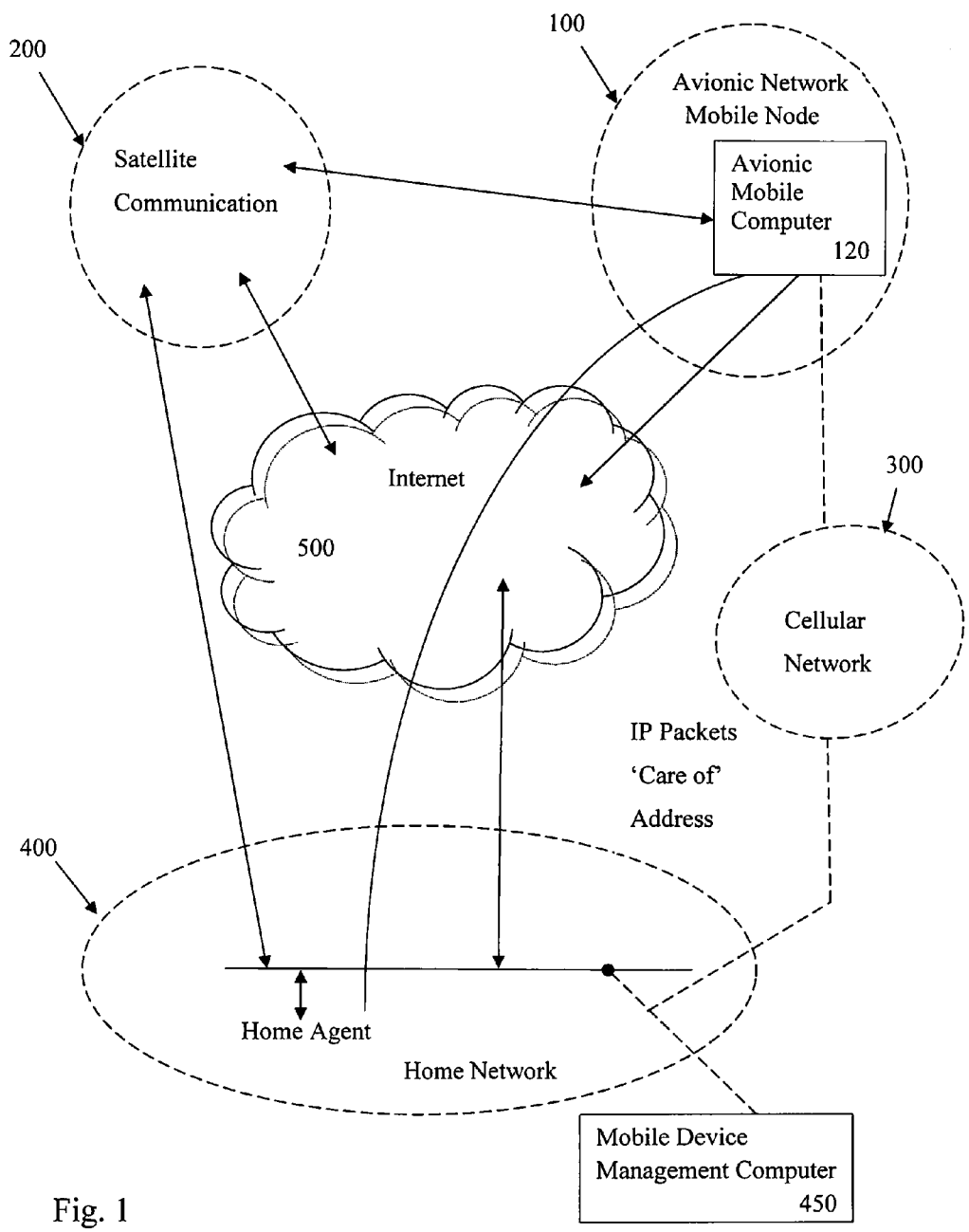
FIG. 1 is a block diagram of the Global One IP air to ground management of multiple communication paths.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

The present invention relates to an onboard avionics mobile computer capable of carrying out communications while moving among a plurality of inter-connected networks. A ground based mobile computer management device manages moving connection information corresponding to the avionic mobile computer and transfers packets destined to the avionics mobile computer via the current connection information using mobile computer management and communication control methods and systems suitable for these devices.

The methods and system of the present invention can be used with one or more other avionic products and or services described in U.S. patent applications, each assigned to Satcom Direct, Inc. the same assignee as this patent application. Specifically, the air to ground management of multiple communication paths can be incorporated with one or more of the following inventions which are all incorporated by reference in their entirety:

U.S. patent application Ser. No. 14/259,796 filed on Apr. 23, 2014, which is incorporated by reference, describes system and method for mobile ground-to-air and air-to-ground communication network acceleration. The system and method can reduce the cost of airborne communication services by creating a faster connection and thus increasing data throughput. In one embodiment, the communication network acceleration system and method provide as much as a four-fold increase over standard high-speed data rates. This increase is made possible in part through the integration, implementation, and use of acceleration and compression technologies in the ground system that supports communications to and from an airborne terminal.

U.S. patent application Ser. No. 14/297,146 filed on Jun. 5, 2014, which is incorporated by reference, describes methods and systems for use of a centrally managed, 'Cloud' based system that is responsible for management on onboard avionics equipment. Specifically, this invention relates to a system whereby an avionics device will communicate with a centrally location "Cloud" system for command and control of both predefined and arbitrary tasks or functions that the onboard avionics will perform.

U.S. patent application Ser. No. 14/309,084 filed on Jun. 19, 2014, which is incorporated by reference, describes a capability which requires aircraft passengers who wish to use Internet Access while onboard on aircraft to watch a mandatory safety briefing video prior to being granted Internet access. During the use of personal electronics devices PED onboard an aircraft, the PEDS connect to an onboard wireless access point (WiFi). Either through onboard avionics equipment, or through a centrally managed ground based infrastructure, the passenger is required to watch a safety briefing video, with our without additional commercial or educations messages, before the PED is allowed access to the Internet. This is similar to many 'WiFi Hotspots' whereby the owner/operations of such require the viewing of advertisement or other communication content prior to being granted Internet access.

U.S. Provisional Patent Application Nos. 61/892,136 filed on Oct. 7, 2013 and 61/994,526 filed on May 16, 2014, assignee to the same assignee as the subject invention, which are both incorporated by reference, describes methods, systems and devices for real position reports between a aircraft and a terrestrial network using SwiftBroadband and a set of calculation instructions which identifies the specific aircraft and calculates multiple variables including, but not limited to, speed, heading, departure airport, and arrival airport. Once all variables have been calculated the system tracks the aircraft status on a map for multiple platforms. The position tracking system generates position reports that can be integrated into combined mapping system of other source data to give the most accurate position data possible.

The avionics mobile computer device of the present invention is configured to support one or more connections to one or more inter-connected communication networks as shown in FIG. 1, and includes prioritization of preferred connections. Prioritization can be based on cost, capacity, speed, latency, performance or other characteristics, and is configurable by the owner of the avionics mobile computer. As shown in FIG. 1, each aircraft avionic network 100 is assigned as a mobile node and the aircraft based mobile node communicates with a mobile computer management device connected with a ground based home network, or home node.

The onboard avionic mobile computer 120 can include a Satcom Direct Router (SDR) that allows simultaneous use of Inmarsat SwiftBroadband, Swift 64, Ku-Band and Ka-Band satellite connections with the ability to deterministically forward data communications over one or more of the communication links based on preset policies as described in co-pending U.S. patent application Ser. No. 14/259,588 filed on Apr. 23, 2014, assigned to same assignee of this application and which is incorporated herein by reference. The Satcom Direct router also provides Wi-Fi—802.11b/n/g (Dual Band 2.4 GHz+5.0 GHz) for high speed up to approximately 150 Mbps Wi-Fi connectivity while onboard and provides 3G/4G cellular network 300 connectivity for high speed data while the aircraft is on the ground to facilitate software updates, remote troubleshooting and data reporting, for example.

In the example shown, the communication link can be via a communication satellite 200 or constellation of communication satellites based on the global position of the aircraft. When the aircraft is on the ground, the avionic mobile computer can communicate with the ground based mobile computer management device 450 via a cellular network 300 and personal mobile communications devices can connect directly to a cellular network.

The avionics mobile computer is also capable of dynamically removing and adding new communications paths, e.g. when a Satellite communications system becomes unavailable or become available due to change in location of the aircraft, or a cellular data connection becomes available when the aircraft is on the ground.

Still referring to FIG. 1, the Global One IP air to ground communication management system 10 includes the avionics mobile computer 120 connected with a mobile node and the avionic mobile computer 120 establishes one or more IP tunnels to the mobile computer management device 450 connected with the home network 400, and the avionic mobile computer 120 monitors and manages traffic over the one or more IP tunnels. As traffic from passengers and/or other onboard avionics equipment is passed through the avionics mobile computer, it is able to redirect or switch the traffic to a different tunnel over one or more alternate communication paths as necessary based on availability of the different IP tunnels due to changes in location of the aircraft. The avionics mobile computer 120 is considered the "Mobile Node".

The mobile computer management device 450 is considered to be the "Home Agent" connected to the "Home Network" 400 and communicates with the Mobile Node 100 through one or more different connections. The connection with the avionic mobile computer connected with the Mobile Node 100 has its own IP address—this is known as the 'Care Of Address'. In order for the mobile device management computer 400 to communicate with the Mobile Node 100, it sends traffic inside of packets destined for the Care Of Address. This setup is known as Mobile IPv4, IETF RFC 2002 & RFC 3344 both of which have been obsoleted by RFC 5944.

Global One IP is applied directly within the avionics mobile computer 100, which is capable of performing all of the tasks related to Mobile IP, as well as managing the specialized satellite and other air-to-ground and ground-to-air communications systems. The avionic mobile computer also includes direct cellular data communications radio in the line replaceable unit (LRU), meaning an all-in-one system is available. This system actively monitors the different connections types, and switches traffic to the highest priority functioning (available) connection. Furthermore, it does this while maintaining the connections of Internet TCP/IP traffic that is passing through the system, allowing passenger or system traffic to remain connected.

The IP address assigned by the Home Agent to the Mobile Node remains the same during the duration of system operation. This IP address can be a Public Internet IP, or a Private non-Internet Routable IP (IETF RFC 1918). By using an IP address that does not change based on the type of communications air-to-ground link, the Global One IP methods and systems allow passengers and other onboard avionic system communications traffic to remain uninterrupted if and when the avionics mobile computer switches between one or more different connection types.

Figure 2:
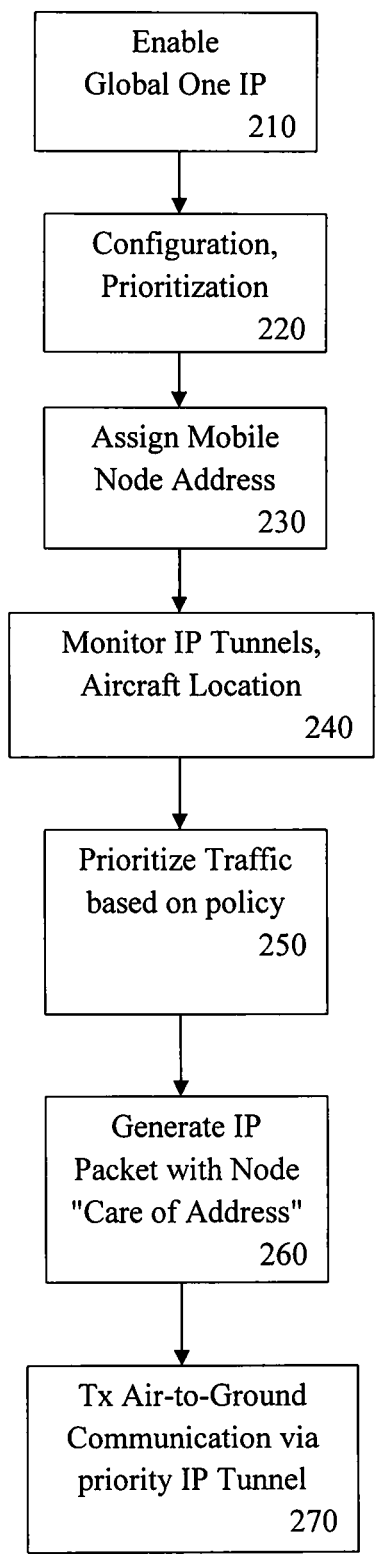
FIG. 2 is flow diagram showing of the Global One IP operation according to an embodiment of the invention.

FIG. 2 is a process flow diagram showing the Global One IP operation. In step 210 the Global One IP product is installed on an aircraft avionics mobile computer device. The avionics mobile computer device is configured to support one or more connections to one or more inter-connected communication networks as shown in FIG. 1. After installation, the user can configure the avionic mobile computer in step 220 to prioritize traffic. For example, prioritization can be based on cost, capacity, speed, latency, performance or other characteristics.

When the aircraft is in-service, the onboard avionic mobile computer is assigned a mobile node address (care of address) in step 230 for the aircraft based mobile node to communicates with the mobile computer management device 450 connected with a ground based home node 400. During flight, in step 240 the avionic mobile computer monitors aircraft location and monitors each of the available IP tunnels. The avionic mobile computer determines which IP tunnel to use in step 250 based on the priority configuration and the collected IP tunnel data. Packets from are generated in step 260 with the destination address of the packet being the mobile node "Care of Address" with the traffic (or payload) carried in the packet. In step 270, data is transmitted and received via the selected IP tunnel. As previously described, during flight, IP tunnels and be added or removed based on the location of the aircraft and the IP tunnels available for that location.

As shown in FIG. 2, the avionic mobile computer method and system of the present invention actively monitors the different connections types, and switches traffic to the highest priority functioning connection. Furthermore, it does this while maintaining the connections of Internet TCP/IP traffic that is passing through the system, allowing passenger or system traffic to remain connected. The ground based mobile computer management device maintains a record of the communication link used by the avionic mobile computer for transmission of traffic destined for the aircraft.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An avionics communication management system comprising:
    an avionic mobile computer device capable of transmitting and receiving communication traffic while moving among a plurality of different communication paths;
    an ISDN interface and two or more simultaneous network interfaces to allow multiple avionic systems to operate on an aircraft wherein a satellite communication link allows simultaneous use of two or more of Inmarsat, Swiftbroadband, Swift64, Ku-Band, and Ka-Band satellite connections to deterministically forward data communications over two or more of said communication links based on preset policies by a user; and
    a ground based mobile computer management device in communication with the avionic mobile computer device, the avionic mobile computer device managing moving location information of the avionic mobile computer device and available communication path and transmitting data packets based on a connection prioritization, an aircraft avionic network being assigned as an aircraft mobile node and said aircraft based mobile node communicating with a mobile computer management device connected with a ground based home network or home node, an avionic mobile computer establishing one or more IP tunnels to said mobile computer management device connected with said home network and said avionic mobile computer monitoring and managing traffic over one or more of said IP tunnels; and an onboard data communication router device adapted to route accelerated and non-accelerated signals and increase effective network capacity of ground to air and air to ground communication systems, the onboard data communication router device including QoS/Prioritization to locate bandwidth per device or person and prevents a single device from consuming all available bandwidth as well as prioritizing traffic for a VVIP.

2. The system of claim 1 further comprising:
    a prioritization assignment to assign a priority level to each of the plurality of different communication paths, the priority configurable by an owner based on one or more of cost, capacity, speed, latency, and performance.

3. The system of claim 1 wherein the plurality of different communication paths includes one or more satellite communication links and a cellular network.

4. The system of claim 1 wherein the avionic mobile computer device is assigned as a mobile node with a care of address by the mobile computer management.

5. The system of claim 4 wherein the care of address is a public Internet routable address.

6. An avionics communication management system comprising:
- an avionic mobile computer device capable of transmitting and receiving communication traffic while moving among a plurality of different communication paths;
- a ground based mobile computer management device in communication with the avionic mobile computer device, the avionic mobile computer device managing moving location information of the avionic mobile computer device and available communication path and transmitting data packets based on a connection prioritization;
- an ISDN interface and two or more simultaneous network interfaces to allow multiple avionic systems to operate on an aircraft wherein a satellite communication link allows simultaneous use of two or more of Inmarsat, Swiftbroadband, Swift64, Ku-Band, and Ka-Band satellite connections to deterministically forward data communications over two or more of said communication links based on preset policies by a user; and
- a router to allow simultaneous use of the two or more of Inmarsat SwiftBroadband, Swift 64, Ku-Band and Ka-Band satellite connections, said router including an onboard data communication router device adapted to route accelerated and non-accelerated signals and increase effective network capacity of ground to air and air to ground communication systems, the onboard data communication router device including QoS/Prioritization to locate bandwidth per device or person and prevents a single device from consuming all available bandwidth as well as prioritizing traffic for a VVIP.

7. A mobile computer management and control method for avionic mobile computer devices comprising the steps of:
- installing a global avionic mobile communication application on an avionic mobile computer device;
- interfacing an ISDN interface and two or more simultaneous network interfaces to multiple avionic systems to operate on an aircraft wherein a satellite communication link allows simultaneous use of two or more of Inmarsat, Swiftbroadband, Swift64, Ku-Band, and Ka-Band satellite connections to deterministically forward data communications over two or more of said communication links based on preset policies by a user;
- assigning a care of address to the avionic mobile communication device by a ground based mobile computer management device on a home network;
- monitoring one or more different available communication paths by a location of the avionic mobile computer device free of intelligent active monitoring or wireless links and determining priority;
- selecting one of the one or more different available communication types based on an avionic mobile computer location in combination with an assigned priority; and
- switching onboard passenger and avionic device traffic to the selected one of the one or more different available communication paths to allow the onboard passenger and avionic device traffic to be uninterrupted, said aircraft avionic network being assigned as a mobile node and said aircraft based mobile node communicating with a mobile computer management device connected with said ground based home network or home node, said avionic mobile computer establishing one or more IP tunnels to said mobile computer management device connected with said home network and said avionic mobile computer monitoring and managing traffic over one or more of said IP tunnels; and
- one or more of accelerating, compressing and caching the data stream at an aircraft based data accelerator device coupled with the onboard data communication router, the onboard data communication router including QoS/Prioritization to locate bandwidth per device or person and prevents a single device from consuming all available bandwidth as well as prioritizing traffic for a VVIP.

8. The method of claim 7 wherein assigning a care of address includes the step of:
- using a public internet address routable over the Internet.

9. The method of claim 7 wherein the selecting step includes the steps of:
- assigning a priority to each of the two or more different communication paths based on one or more of a cost, capacity, speed, latency, performance or other characteristics by an owner of the avionics mobile computer device.

10. The method of claim 7 further comprising the step of:
- managing a moving connection information corresponding to the aircraft at the mobile computer management device.

11. The method of claim 7 wherein the switching step includes:
- switching the onboard passenger traffic to a cellular network when the aircraft is on the ground.

12. The method of claim 7 further comprising the step of:
- using an aircraft position tracking system for monitoring the location of the aircraft.

13. A mobile computer management and control method for avionic mobile computer devices comprising the steps of:
- installing a global avionic mobile communication application on an avionic mobile computer device;
- interfacing an ISDN interface and two or more simultaneous network interfaces to multiple avionic systems to operate on an aircraft wherein a satellite communication link allows simultaneous use of two or more of Inmarsat, Swiftbroadband, Swift64, Ku-Band, and Ka-Band satellite connections to deterministically forward data communications over two or more of said communication links based on preset policies by a user;
- assigning a care of address to the avionic mobile communication device by a ground based mobile computer management device on a home network;
- monitoring two or more different available communication paths by the avionic mobile computer device;
- selecting two of the two or more different available communication types based on an avionic mobile computer location in combination with an assigned priority; and
- switching onboard passenger and avionic device traffic to the selected two of the two or more different available communication paths to allow the onboard passenger and avionic device traffic to be uninterrupted; and
- coupling the avionic mobile computer device with an onboard data communication router to allow simultaneous use of the two or more of Inmarsat SwiftBroadband, Swift 64, Ku-Band and Ka-Band satellite connections; and
- one or more of accelerating, compressing and caching the data stream at an aircraft based data accelerator device coupled with said onboard data communication router, said onboard data communication router including QoS/Prioritization to locate bandwidth per device or person and prevents a single device from consuming all available bandwidth as well as prioritizing traffic for a VVIP.

\* \* \* \* \*